(12) United States Patent
Abraham et al.

(10) Patent No.: US 8,363,979 B2
(45) Date of Patent: Jan. 29, 2013

(54) METHOD FOR ASCERTAINING THE AXIS OF ROTATION OF A VEHICLE WHEEL

(75) Inventors: Steffen Abraham, Hildesheim (DE); Andreas Haja, Hannover (DE); Christian Knoll, Stuttgart (DE); Ulrich Kallmann, Tuebingen (DE); Walter Happold, Untergruppenbach (DE)

(73) Assignee: Robert Bosch GmbH, Stuttgart (DE)

( * ) Notice: Subject to any disclaimer, the term of this patent is extended or adjusted under 35 U.S.C. 154(b) by 419 days.

(21) Appl. No.: 12/308,492

(22) PCT Filed: Sep. 21, 2007

(86) PCT No.: PCT/EP2007/060018
§ 371 (c)(1),
(2), (4) Date: Aug. 12, 2010

(87) PCT Pub. No.: WO2008/046715
PCT Pub. Date: Apr. 24, 2008

(65) Prior Publication Data
US 2010/0303336 A1 Dec. 2, 2010

(30) Foreign Application Priority Data
Oct. 16, 2006 (DE) .................... 10 2006 048 725

(51) Int. Cl.
*G06K 9/36* (2006.01)
(52) U.S. Cl. ... 382/285; 382/291; 382/296; 356/139.09; 356/155
(58) Field of Classification Search .................. 382/285, 382/291, 296, 297; 356/139.09, 153, 155
See application file for complete search history.

(56) References Cited

U.S. PATENT DOCUMENTS

| 4,745,469 | A | 5/1988 | Waldecker et al. |
| 7,230,694 | B2 | 6/2007 | Forster et al. |
| 7,336,350 | B2 * | 2/2008 | Dorrance et al. ........ 356/139.09 |
| 7,710,555 | B2 * | 5/2010 | Hoenke et al. ................ 356/155 |
| 7,864,309 | B2 * | 1/2011 | De Sloovere et al. ... 356/139.09 |

(Continued)

FOREIGN PATENT DOCUMENTS

| DE | 2948573 | 6/1981 |
| DE | 10032356 | 1/2002 |

(Continued)

OTHER PUBLICATIONS

International Search Report, PCT International Patent Application No. PCT/EP2007/060018, dated Dec. 10, 2007.

*Primary Examiner* — Yosef Kassa
(74) *Attorney, Agent, or Firm* — Kenyon & Kenyon LLP

(57) ABSTRACT

A method for ascertaining the axis of rotation of a vehicle wheel in which a light pattern is projected at least onto the wheel during the rotation of the wheel and the light pattern reflected from the wheel is detected by a calibrated imaging sensor system and analyzed in an analyzer device. Accurate and robust measurement of the axis of rotation and, optionally, of the axis and wheel geometry, in particular when the vehicle is passing by, is achieved in that a 3D point cloud with respect to the wheel is determined in the analysis and a parametric surface model of the wheel is adapted thereto; normal vectors of the wheel are calculated for different rotational positions of the wheel for obtaining the axes of rotation; and the axis of rotation vector is calculated as the axis of rotation from the spatial movement of the normal vector of the wheel.

12 Claims, 4 Drawing Sheets

U.S. PATENT DOCUMENTS

| | | | |
|---|---|---|---|
| 7,869,018 B2 * | 1/2011 | Strege et al. | 356/139.09 |
| 8,107,062 B2 * | 1/2012 | De Sloovere et al. | 356/139.09 |
| 2007/0283582 A1 | 12/2007 | Donner et al. | |
| 2008/0174789 A1 | 7/2008 | Uffenkamp et al. | |
| 2008/0186514 A1 | 8/2008 | Uffenkamp et al. | |

FOREIGN PATENT DOCUMENTS

| | | |
|---|---|---|
| DE | 10335829 | 3/2005 |
| DE | 102004013441 | 10/2005 |
| DE | 102005017624 | 10/2006 |
| DE | 102005063082 | 7/2007 |
| DE | 102005063083 | 7/2007 |
| EP | 0895056 | 2/1999 |
| JP | 09280843 | 10/1997 |
| WO | WO 2005/090906 | 9/2005 |
| WO | WO 2006/130694 | 12/2006 |

* cited by examiner

METHOD FOR ASCERTAINING THE AXIS OF ROTATION OF A VEHICLE WHEEL

FIELD OF THE INVENTION

The present invention relates to a method for ascertaining the axis of rotation of a vehicle wheel, in which a light pattern is projected at least onto the wheel during the rotation of the wheel and the light pattern reflected from the wheel is detected by a calibrated imaging sensor system and analyzed in an analyzer device.

BACKGROUND INFORMATION

A method and a corresponding device of this type are described in U.S. Pat. No. 4,745,469, where an axis measurement is performed on the basis of the ascertained axis of rotation, in particular the trail angle and the camber angle are ascertained, while the vehicle is on a chassis dynamometer. Using a projection system, laser lines or other patterns are projected onto the wheel or onto the tire. Using cameras, the patterns are imaged and the 3D coordinates are reconstructed on the surface from the camera coordinates and from the conventional arrangement of the cameras with respect to the projector via triangulation, and the position of the wheel is ascertained therefrom, from which finally the trail (angle) and the camber (angle) are determined. This contactless optical measurement takes place while the wheel rotates about its axis of rotation, fixedly mounted in the chassis dynamometer.

German Patent Application No. DE 103 35 829 A1 also describes a method for determining the axis geometry in which a light pattern is projected onto the front of the wheel and the light reflected from the front of the wheel is recorded by an image converter from a direction different from the projection direction, a flat projection of the light and a flat recording of the light reflected by the wheel during the rotation of the wheel being provided to determine the normal vector of the wheel or a reference plane as accurately and robustly as possible despite the unevenness present on typical wheels. The reference plane and the related normal vector are ascertained on a rotating wheel which executes at least one complete revolution. A strip pattern, a monochrome grid structure, or a two-dimensional color pattern are preferably used as projected light patterns.

German Patent Application No. DE 10 2005 063 082 A1 and DE 10 2005 063 083 A1 also describe methods for optical chassis measurement in which structured light is projected onto the wheel and also onto the surrounding body areas and is recorded using an imaging sensor system.

In other methods and devices for ascertaining the axis of rotation and measuring the axis geometry, the vehicle wheel is observed using a mono or stereo camera system such as described, for example, in European Patent No. EP 0 895 056 A2 and German Patent Application No. DE 29 48 573 A1. Distinctive features such as, for example, the rim edge, are located in the grayscale image of the camera display. From the geometric position of the rim edge or other features in the image, their spatial position and, from there, their trail and camber, are calculated. A measuring method of this type is also performed in German Patent Application No. DE 10 2004 013 441 A1, where a 3D model is fitted for ascertaining the axis of rotation of the wheel. During the measurement, stereo pictures of the wheel rim are also taken and the angular position of the valve is established. German Patent Application No. DE 10 2005 017 624.0 describes obtaining wheel features and/or body features by ascertaining a 3D point cloud to determine the wheel geometry and/or the axis geometry of vehicles therefrom, the rotating wheel being recorded, in particular, also while the vehicle is passing by.

There are also methods in which instead of existing wheel features, special markings are applied using a mechanical arrangement such as described, for example, in German Patent Application No. DE 100 32 356 A1. While markings of this type provide structures on the wheel that are easily detectable for measuring and analysis, they require additional effort.

In contrast, in previous methods and devices without special markings or using projected light, it is difficult to obtain exact and reliable, robust measurements of the axis geometry or wheel geometry and of the axis of rotation of a vehicle wheel, in particular under the rough measuring conditions of a workshop testing site and complying with the requirement of the simplest possible performance of the measurement.

SUMMARY

An object of the present invention is to provide a method for ascertaining the axis of rotation of a vehicle wheel and therefrom, if necessary, the axis geometry and/or wheel geometry, using which the most exact and reliable measured values are obtained with the least possible complexity.

This object may be achieved by determining a 3D point cloud with respect to the wheel in the analysis and a parametric surface model of the wheel is adapted thereto; normal vectors of the wheel are calculated for different rotational positions of the wheel for obtaining the wheel axes; and the axis of rotation vector is calculated as the axis of rotation from the spatial movement of the normal vector of the wheel. Using the structured lighting of the wheel produced by the projection of the light pattern and the analysis with the help of a 3D point cloud and fitting of a parametric surface model of the wheel, the normal vectors of the wheel may be calculated during the rotation of the wheel without complex mechanical measuring setup and using a simple measuring method and the axis of rotation may be ascertained therefrom. Exact and reliable axis and wheel geometry data in particular may then be obtained on the basis of the ascertained axis of rotation.

According to advantageous embodiments of the method, the reflected light pattern is recorded with the aid of a mono, stereo, or multi-camera system of the imaging sensor system and, in the case of stereo recording, the measured points obtained using the two camera images are associated in terms of correspondence, and the 3D coordinates of the particular measured point are calculated from the stereo correspondence and the calibration data.

Increased accuracy is achieved here by using a deformable model for fitting as a surface model for shape compensation.

The measures of projecting the light pattern and recording by the imaging sensor system while the vehicle is passing by contribute to a simple and rapid measurement.

A procedure that is advantageous for the measurement and analysis results from calculating the corresponding wheel axes for multiple wheel positions and, in addition, determining the spatial positions of the wheel centers, shifting the wheel centers and the corresponding wheel axes to a common center, and identifying the axis of rotation as the axis of the resulting cone or truncated cone.

For a simple measurement, it is furthermore advantageously provided that the movement of the vehicle is determined three-dimensionally, by detecting the movement of the body as it is passing by.

An advantageous procedure in measuring and analyzing includes determining the translational displacements of the normal vectors of the wheel resulting from passing by from the direction of movement and the velocity of the adapted 3D point clouds for each recorded image, pushing together into themselves the spiral paths described by the normal vectors of the wheel into a revolving curve by mathematically eliminating the translational displacements and by ascertaining the normal vector to the flat surface circumscribed by the revolving curve through its center as the rotation axis vector.

Furthermore, the measures for increasing the accuracy of the position determination, by determining the rotational frequency and, therefrom, the angle of rotation, from the velocity vector and the radius of a corresponding segmented wheel object, contribute to the reliability of the measurement results.

Further advantageous measures include calculating the trail angle and the camber angle from the rotation axis vector ascertained during the movement of the wheel and possibly of the vehicle and from a measured value of the normal vector of the wheel obtained on the wheel at rest.

Different further possible embodiments of the method result from using a cylinder or an idealized wheel as the surface model for fitting into the point cloud.

BRIEF DESCRIPTION OF THE DRAWINGS

The present invention is explained in greater detail below on the basis of exemplary embodiments with reference to the figures.

DETAILED DESCRIPTION OF EXAMPLE EMBODIMENTS

Figure 1:
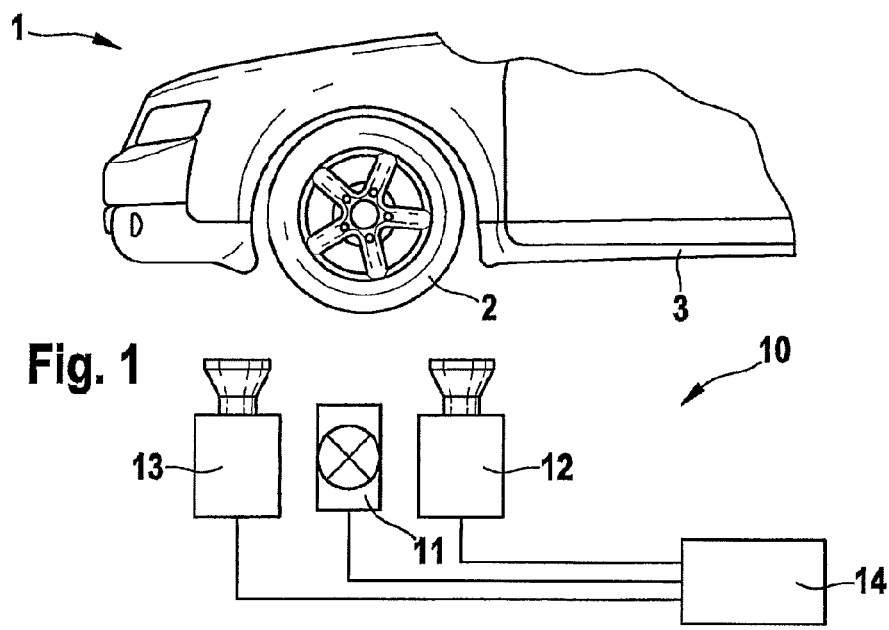
FIG. 1 shows a schematic view of a measuring device in a measuring environment for determining the axis of rotation of a vehicle [wheel].

FIG. 1 shows a measuring environment for ascertaining the axis of rotation of a vehicle wheel 2 with the aid of a measuring device 10, vehicle 1 being capable of moving past measuring device 10. In addition to wheel 2, body 3 may also be included in the measurement, preferably in the surroundings of wheel 2.

Measuring device 10 has a projection device 11 for light patterns 15 (see FIG. 2) and two imaging sensor units 12, 13 situated in a predefined spatial position and direction thereto, and a control unit 14, which is connected for data transmission to projection device 11 and imaging sensor units 12, 13, positioned in stereo formation, and electronic devices for controlling projection device 11, imaging sensor units 12, 13, and possibly other connected components and for analyzing the data and displaying the measurement results.

Figure 2:
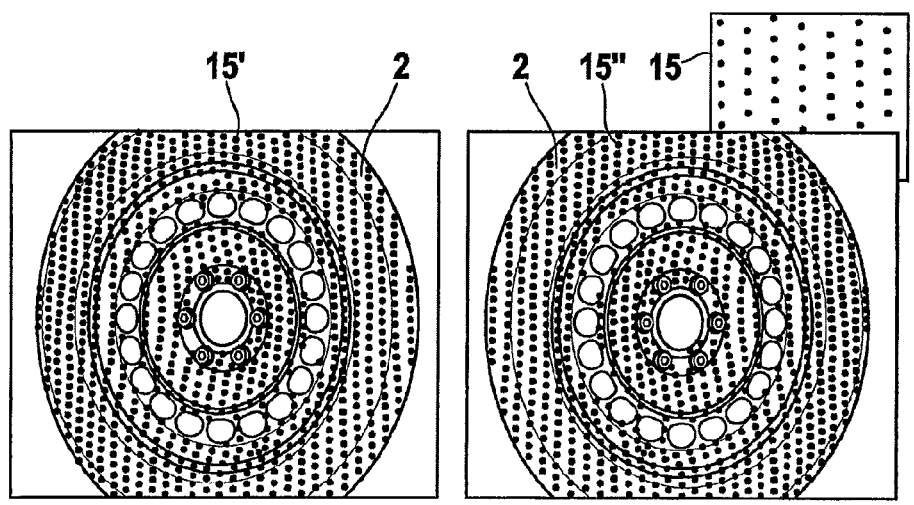
FIG. 2 shows a projected light pattern.

FIG. 2 shows, in addition to light pattern 15, light patterns 15' and 15" reflected from the wheel, resulting from the view of the two imaging sensor units 12, 13, namely the left and right stereo cameras, the linear arrangement of the light points in the two images having different curvatures. The light pattern is, for example, a laser point pattern.

Figure 3:
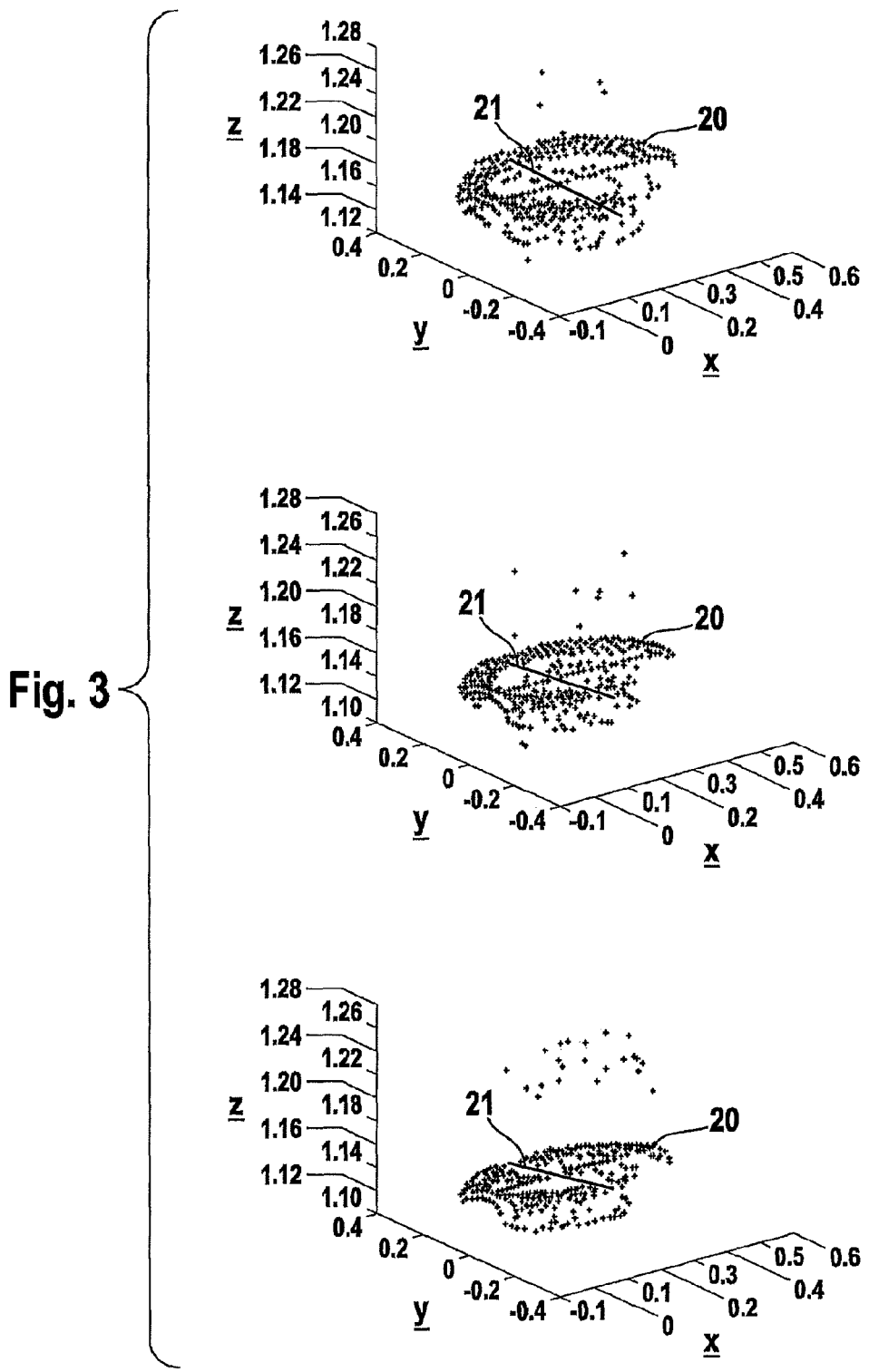
FIG. 3 shows ascertained 3D point clouds with respect to the wheel in different recording directions and the resulting angles of inclination.

FIG. 3 shows the determination of 3D point clouds 20 with respect to the wheel from the stereo displacement vector for different angles of inclination along inclination lines 21 with respect to imaging sensor units 12, 13, namely at angles of inclination of 0°, 1° and 2° in the left-hand, central, and right-hand partial images.

Figure 4:
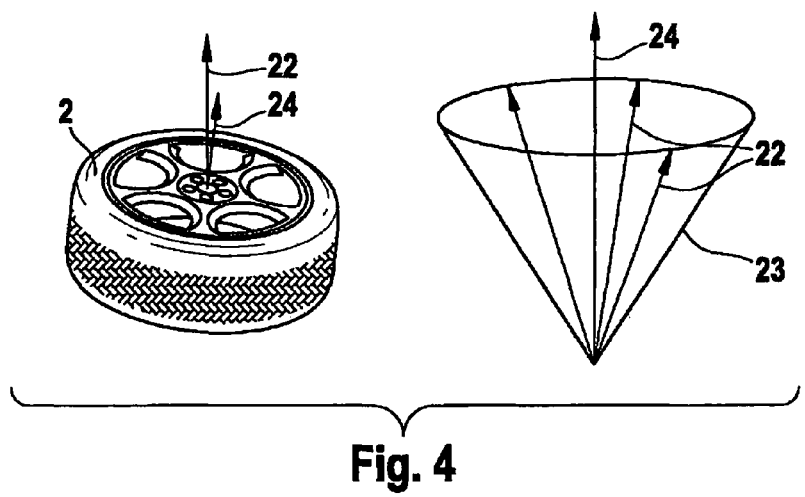
FIG. 4 shows a schematic depiction of the relationship between the wheel axis and the ascertained axis of rotation.

FIG. 4 shows different wheel axes obtained during the measurement, situated on a conical surface, and the axis of rotation ascertained therefrom, specifically as wheel axis vector 22, wheel axis cone 23, and axis of rotation vector 24.

Figure 5:
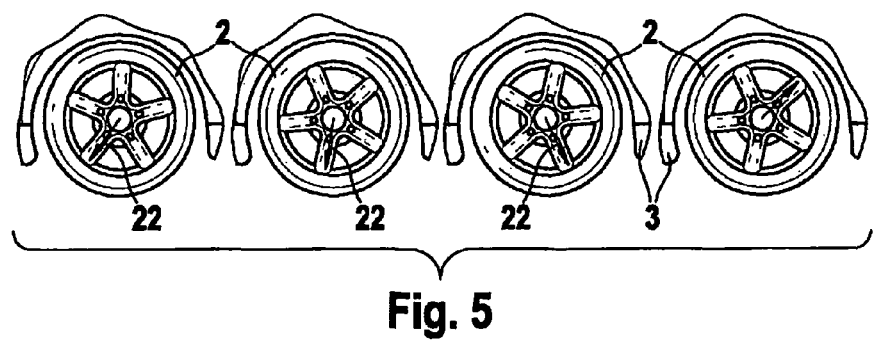
FIG. 5 shows a depiction of the translation of the wheel axis vectors along a straight line.

As FIG. 5 shows, when vehicle 1 drives by, a translation of wheel axis vectors 22 occurs (in a simplified assumption) along a straight line, however, in general on a curved path.

Figure 6:
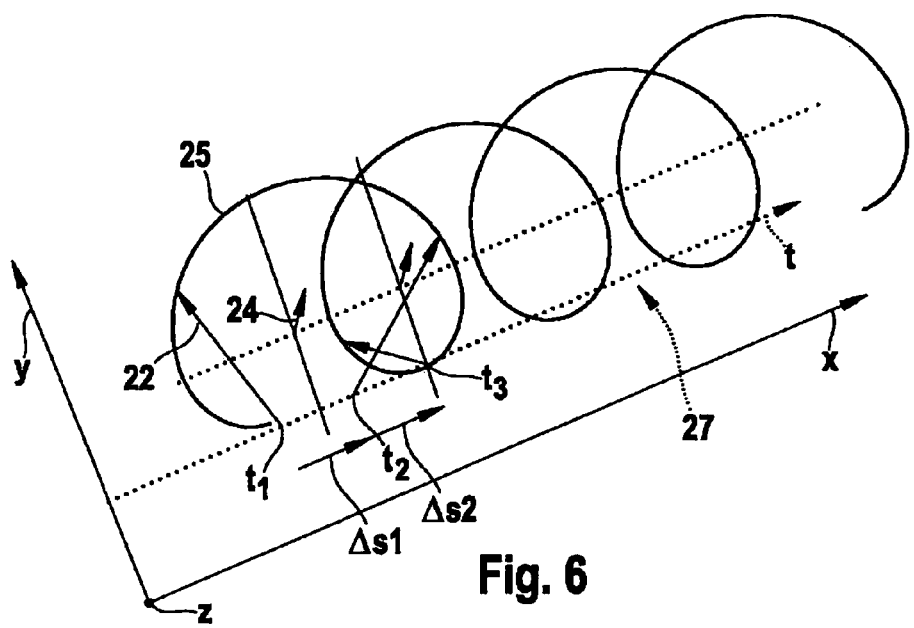
FIG. 6 shows a depiction of a spiral path by the normal vectors of a segmented 3D wheel object to form consecutive images of an image sequence.
Figure 7:
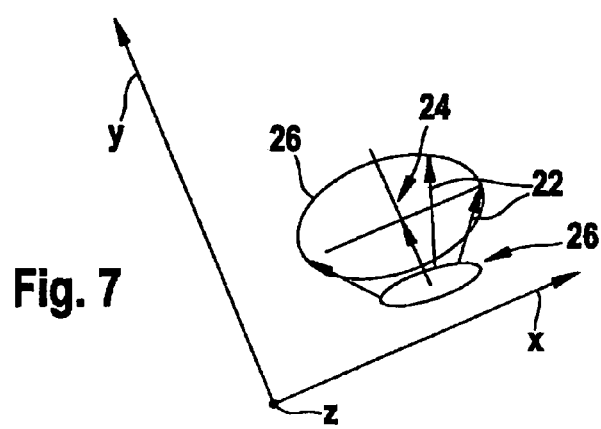
FIG. 7 shows a compression of the spiral path of FIG. 6 via displacement along the translation caused by the Movement of the vehicle.

As is apparent from FIG. 6, the normal vectors of a segmented 3D wheel object describe a spiral path 25, viewed via the images of an image sequence at times $t_1$, $t_2$, $t_3$, etc., a wheel center trajectory 27 arising from the movement of vehicle 1 when driving by. The three spatial directions are labeled x, y, z, and the displacement is labeled $\Delta s1$, $\Delta s2$. By displacing the spiral arcs by displacement $\Delta s$, a compression of the spiral to a compression ellipsis 26 results, as shown in FIG. 7.

Measuring device 10 is designed for performing an accurate and robust measurement and for ascertaining the axis of rotation of vehicle wheel 2 and, if necessary, for determining further axis or wheel geometry data. Due to the projection of light patterns 15, the method is independent of reference points which are fixedly linked to the wheel surface or the wheel texture and wander therewith during movement. Therefore, structures on the wheel surface do not need to be recognized. Instead, due to the structured illumination with the aid of the light patterns, stable features are produced, which are not fixedly linked to the wheel surface and therefore do not wander therewith as wheel 2 is moving. On the other hand, determining the axis of rotation of the wheel, in particular as the vehicle drives by measuring device 10, is therefore difficult. Conventional methods using structured illumination are based on in-place rotation of the wheel about its axis of rotation, in particular on a chassis dynamometer.

The procedure shown here also makes it possible to determine the position of the axis of rotation in particular when vehicle 1 is passing by measuring device 10. Rotating the wheel in place (chassis dynamometer or raising the vehicle) is no longer necessary. The axis geometry such as the trail and the camber may be calculated from the known position of the axes of rotation. A compensation of the lateral runout of the rim is also performed.

Projection of light pattern 15, for example, light dots, light sections, or texture, onto the wheel when the vehicle is passing by, with 3D measurement of the structured illumination with the aid of one or more imaging sensor units 12 in the form of a mono, stereo, or multi-camera system, makes accurate and robust calculation of the position of the axis of rotation of wheel 2 with respect to the wheel surface possible, the algorithmic analysis of the measured data being performed by determining a 3D point cloud 20. The structured illumination makes a stable analysis largely independent of the surface properties of the rim and the tire.

As the method is executed, the pattern is projected at each time step and a 3D point cloud 20 is calculated therefrom. The parametric surface model of wheel 2 is fitted into 3D point cloud 20. A wheel center and a normal vector of the wheel are thus obtained. During the entire period of measurement while the vehicle is passing by, the spatial position of the axis of rotation is determined in a global coordinate system and with respect to the wheel surface from the spatial movement of the wheel centers and of the normal vectors of the wheel. The spatial position of the axis of rotation of wheel 2 in the global coordinate system is used, for example, for calculating the trail and the camber. Knowing the position of the axis of rotation with respect to the wheel surface is used for the subsequent measuring steps (for example, adjustment work) for determining the position of the axis of rotation in the global coordinate system; this is the so-called compensation of the lateral runout of the rim.

The structure projected by projection device 11 onto wheel 2 and optionally onto body 3 may be a regular or irregular dot pattern, a line or stripe pattern, a random pattern, or a combination of these structures. Different alternatives of the illumination for producing light pattern 15 are illumination using laser and special projection optical systems (conventional or interference optical systems), illumination using a special projection optical system and slides or illumination with Beamer projection systems (for example, illumination using DLP chips and projection optical systems). The analyzing computer in control unit 14 is responsible for analyzing the image data and, in general, for controlling the illumination unit or projector.

A stereo calibration of imaging sensor units 12, i.e., of the camera system in particular, and calculation of 3D point cloud 20 are essentially known, in which regard reference is made, for example, to the above-mentioned German Patent Application No. DE 10 2005 017 624.0, the calculation of the 3D point cloud being used there, however, for ascertaining wheel and body features. The patterns allow corresponding measured points in the left-hand and right-hand camera pictures (see FIG. 2) to be associated with each other very accurately. From the known stereo correspondence and calibration data, the 3D coordinates of the particular measured point are then calculated (see FIG. 3).

In order to be able to determine the spatial orientation of wheel 2, the wheel axis, from the 3D point cloud, a suitable surface model is fitted into point cloud 20 and its orientation is determined. For this purpose, conventional methods may be used, for example, according to Lowe D. G. "Fitting parameterized 3D Models to Images" IEEE Trans. On Pattern Analysis and Machine Intelligence 13(5), pp. 441-450, 1991 or according to Kölzow T., Krüger L.; "Matching of 3D Model into a 2D Image Using a Hypothesize and Test Alignment Method," Proceedings of SPIE 47th Annual Symposium, 2002. In order to refine the measurement results, in the event of a strong deviation of the wheel shape from the model used, a method for shape compensation via deformable models may additionally be used, for example, according to Cootes, T. F., Edwards G. J., Taylor C. J., 1998, "Active Appearance Models," Proc. European Conf. On Computer Vision, Vol. 2, Springer, pp. 484-498.

A close-meshed laser point pattern, for example, may be projected as a light pattern onto the tire as shown in FIG. 2. For each laser point, the depth is calculated from the displacement vectors (disparity) of the two stereo images to increase the accuracy and robustness. A 3D point cloud 20 of the visible front area of wheel 2 is thus obtained. The interpolation points are not uniquely associated to reference points on the wheel surface, but wander thereon when wheel 2 is displaced or moved. A wheel model, for example, a cylinder or idealized wheel, is then fitted into the full 3D point cloud 20. This may be implemented using simpler 3D matching methods, but also more complex methods such as, for example, using the generalized Hough transformation such as described, for example, in D. H. Ballard, "Generalizing the Hough Transform to detect arbitrary shapes," Pattern Recognition, Vol. 13, No. 2, pp. 111-122, 1981, or in Ashok Samal and Jodi Edwards, "Generalised Hough Transform," LME 2, 1998. In addition to surface and edge features, other features such as light-dark transitions and coarse-fine matching strategies with coarse and fine Hough accumulator quantification may also be used. A Hough cylinder transformation, where the accumulator cell has cylinder coordinates as parameters, may offer advantages in robustness and computation time in this context.

If necessary due to stronger topological deviations (deformation) between model and actual wheel object, a so-called active shape model (ASM) having the so-called point distribution model (PDM) of Cootes, Hill, Taylor and Haslam (Cootes T. F., Hill. A., Taylor C. J., Haslam J., 1994, "The Use of Active Shape Models for Locating Structures in Medical Images"; Image and Vision Computing Vol. 12-6, pp. 355-366) may also be used for describing an unordered 3D point cloud 20 in the X, Y, Z space. Using the ASM and PDM methods, the rank of the idealized wheel models may be described as a 3D point cloud 20 via the deformation of the characteristic matrices, and thus the deformed model may be optimally adapted to wheel 2. Normal vector 22 of the wheel may be determined from the position of the wheel model fitted into 3D point cloud 20. However, the normal vector does not correspond to actual axis of rotation vector 24.

Axis of rotation vector 24 is determined on measuring device 10 while the vehicle is passing by. The corresponding wheel axes are calculated for multiple wheel positions (see FIG. 5). In addition, the spatial positions of the wheel centers are determined. In order to finally calculate the axis of rotation of wheel 2, all wheel centers and the corresponding wheel axes are shifted into a common center. In the simplest case, this is a linear translation of the wheel centers (see FIG. 6), whereby the shift into each other is simplified.

In a real movement of vehicle 1, pitch, roll, yaw, and spring movements of vehicle 1 also occur. A linear movement may no longer be assumed in this case. The movement of the vehicle is detected in three dimensions, for example, via the movement of body 3. The volume spanned by the wheel axes shifted into each other resembles a cone, as shown in FIG. 4, whose axis of symmetry corresponds to the axis of rotation of wheel 2. To determine the axis of rotation, the parameters of a cone model are ascertained via a fitting approach which takes into account all wheel axes and measured quantities as also shown in FIG. 4.

An advantage of this method is that the angles of rotation between the wheel positions do not need to be known for determining the axis of rotation. Therefore, no distinctive features on the wheel need to be recognized, assigned, or pursued. The serious problems of no robustness in the recognizability of surface features of the wheel are also avoided. If the axis of rotation is known, compensation of the lateral runout of the rim may be performed for subsequent measurements of the wheel axes and ultimately of the axis geometry.

When driving by, the image sequence of the normal vector of the wheel in time is determined for each stereo image shot with the wheel center as the point of departure and unit length 1. The wheel center corresponds to the locus of the fitted 3D model center. Using methods such as Kalman filter (see Kalman R. E., "A New Approach to Linear Filtering and Prediction Problems," Journal of Basic Engineering (ASME) Vol. 82D, March 1960, 35-45), the wheel may be followed as a 3D object when driving by and velocity vector v (and direction vector) may be determined.

As is shown in from FIG. 6, normal vectors 22 move on a spiral-shaped path 25 around axis of rotation vector 24. The points of origin of normal vectors 22 move on trajectory 27.

The trajectory may also be a curve and does not need to be parallel to the sensor system axis of the two cameras.

The wheel centers do not need to be located on the axis of rotation. The wheel then has a vertical runout. A correction may then take place, for example, via a displacement, i.e., a determination of segment Δs by detecting the movements of the body or via assumptions about the body movement (smooth, straight-line movement). Circles 26 are obtained in the space. The axis of rotation is then the normal vector of the circle obtained. Wheel center 28 and normal vector 22 of the wheel provide, in their spatial movement, a truncated cone in space.

In addition, but not necessarily, the rotation frequency and thus the angle of rotation may be ascertained from velocity vector v and the radius of the segmented wheel object. From the angles of rotation thus obtained, the accuracy of the position determination of the corresponding normal vectors may be increased if necessary.

The camber angle and the trail angle may be calculated from axis of rotation vector 24 ascertained during the movement and from the measured value of the normal vector, which may be determined on the wheel at rest with a higher accuracy (without movement fuzziness) on a raised platform.

Another advantage of the above-described method is that the wheel angle of rotation does not need to be determined from features in low-contrast 2D grayscale images of the wheel surface. Instead, only the robust 3D point clouds which have been determined from light patterns 15 which do not rotate together with the wheel, may be used for determining the camber angle and the trail angle.

A complex detection of reference points to be recognized on the wheel surface as structures in 2D grayscale images, which highly depends on the surface of the wheel, may thus be dispensed with. Instead, the object may be achieved using stable 3D measured data for the model-supported 3D fitting, which move on the wheel surface independently of the surface structures as a function of the angular deflection. The data may be recorded on line and subsequently analyzed off line. Using appropriate processors, the speed of the algorithms may be increased in the hardware.

In principle, detection of an angle of rotation on the basis of a fixed feature such as, for example, a valve, is not necessary, but may be used additionally for increasing the measurement accuracy. The angle of rotation may also be determined from the position of the normal vector on the corresponding spiral path (cycloid) or after back-calculation.

What is claimed is:

1. A method for ascertaining an axis of rotation of a vehicle wheel, comprising:
   projecting a light pattern at least onto the wheel during rotation of the wheel;
   detecting a light pattern reflected from the wheel by a calibrated imaging sensor system; and
   analyzing the light pattern in an analyzer device, the analyzing including determining a 3D point cloud with respect to the wheel, fitting a parametric surface model of the wheel to the point cloud, calculating normal vectors of the wheel for different rotation positions of the wheel to obtain wheel axes, an axis of rotation vector being calculated as the axis of rotation from a spatial movement of the normal vector of the wheel.

2. The method as recited in claim 1, wherein the reflected light pattern is recorded using a mono, stereo, or multi-camera system.

3. The method as recited in claim 2, wherein the reflected light pattern is stereo recorded, measured points obtained using two camera images of the stereo recording being associated in terms of correspondence and 3D coordinates of the measured points are calculated from the stereo correspondence and calibration data.

4. The method as recited in claim 1, wherein a deformable model is used for fitting as a surface model for shape compensation.

5. The method as recited in claim 1, wherein the light pattern is projected and recorded by the imaging sensor system while the vehicle is passing by.

6. The method as recited in claim 5, wherein movement of the vehicle is determined three-dimensionally by detecting the movement of a body of the vehicle body as it is passing by.

7. The method as recited in claim 5, wherein translational displacements of the normal vectors of the wheel occurring as the vehicle is passing by are determined from a direction of movement and velocity of the fitted 3D point clouds for each recorded image; spiral paths of the normal vectors of the wheel are pushed together into themselves to form a revolving curve while translational displacements are mathematically eliminated; and a normal vector to a plane surface circumscribed by the revolving curve through its center is ascertained as the axis of rotation vector.

8. The method as recited in claim 7, wherein a rotational frequency and the angle of rotation are determined from a velocity vector and a radius of a corresponding segmented wheel object for increasing an accuracy of a position determination of the corresponding normal vectors of the wheel.

9. The method as recited in claim 1, wherein the wheel axes are calculated for multiple wheel positions and spatial positions of wheel centers are determined, the wheel centers and the corresponding wheel axes are shifted into a common center, and the axis of rotation is identified as the axis of a truncated cone obtained.

10. The method as recited in claim 1, wherein a trail angle and a camber angle are calculated from the axis of rotation vector ascertained during a movement of the wheel and from a measured value of a normal vector of the wheel obtained on the wheel at rest.

11. The method as recited in claim 1, wherein a cylinder or idealized wheel is used as a basis for the surface model for fitting into the point cloud.

12. The method as recited in claim 1, wherein a rotational angle is determined from a surface texture in unstructured illumination.

* * * * *

UNITED STATES PATENT AND TRADEMARK OFFICE
CERTIFICATE OF CORRECTION

PATENT NO. : 8,363,979 B2  Page 1 of 1
APPLICATION NO. : 12/308492
DATED : January 29, 2013
INVENTOR(S) : Abraham et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 942 days.

Signed and Sealed this
First Day of September, 2015

Michelle K. Lee
*Director of the United States Patent and Trademark Office*